(12) United States Patent
Jun (10) Patent No.: US 11,586,005 B2
(45) Date of Patent: Feb. 21, 2023

(54) LENS MODULE AND CAMERA MODULE INCLUDING THE SAME

(71) Applicant: Samsung Electro-Mechanics Co., Ltd., Suwon-si (KR)

(72) Inventor: Jae Woo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 150 days.

(21) Appl. No.: 17/197,415

(22) Filed: Mar. 10, 2021

(65) Prior Publication Data

US 2022/0066124 A1 Mar. 3, 2022

(30) Foreign Application Priority Data

Sep. 3, 2020 (KR) .......................... 10-2020-0112427

(51) Int. Cl.
| | |
|---|---|
| *G02B 7/08* | (2021.01) |
| *G03B 3/10* | (2021.01) |
| *G03B 3/02* | (2021.01) |
| *G03B 30/00* | (2021.01) |

(52) U.S. Cl.
CPC ................ *G02B 7/08* (2013.01); *G03B 3/02* (2013.01); *G03B 3/10* (2013.01); *G03B 30/00* (2021.01); *G03B 2205/0046* (2013.01); *G03B 2205/0053* (2013.01)

(58) Field of Classification Search
CPC . G02B 7/022; G03B 17/12; G03B 2205/0046
See application file for complete search history.

(56) References Cited

U.S. PATENT DOCUMENTS

| 8,692,929 | B2 | 4/2014 | Hata et al. |
| 11,086,103 | B2 * | 8/2021 | Jun .......................... F03G 7/065 |
| 11,105,319 | B2 * | 8/2021 | Miller ................... G02B 6/3584 |

(Continued)

FOREIGN PATENT DOCUMENTS

| JP | 2014-160122 A | 9/2014 |
| KR | 10-0730910 B1 | 6/2007 |

(Continued)

OTHER PUBLICATIONS

Korean Notice of Reason for Rejection dated Oct. 15, 2021 in corresponding Korean Patent Application No. 10-2020-0112427. (8 pages in English and 6 pages in Korean).

*Primary Examiner* — Clayton E. LaBalle
*Assistant Examiner* — Diana Hancock
(74) *Attorney, Agent, or Firm* — NSIP Law (57) ABSTRACT

A lens module includes a carrier having an internal space; a lens unit including a plurality of lens groups, and installed in the carrier to move at least one of the lens groups in a length direction of the carrier; a lens guide unit including a plurality of guide members arranged on first and second surfaces of the plurality of lens groups, to guide movement of at least two lens groups of the plurality of lens groups; and a plurality of driving wires connected to each of the plurality of guide members. The carrier includes an auxiliary guide member having an auxiliary guide hole, and disposed on at least one of the first and second surfaces of the plurality of lens group, the auxiliary guide hole being disposed parallel to a movement direction of the at least two lens groups to guide movement of the at least two lens groups.

18 Claims, 7 Drawing Sheets

(56) References Cited

U.S. PATENT DOCUMENTS

| | | | |
|---|---|---|---|
| 2014/0009631 A1 | 1/2014 | Topliss | |
| 2015/0135703 A1* | 5/2015 | Eddington | G03B 5/00 60/528 |
| 2020/0041872 A1* | 2/2020 | Köpfer | G02B 7/09 |
| 2020/0142161 A1 | 5/2020 | Jun | |
| 2020/0310224 A1* | 10/2020 | Fang | G03B 3/10 |
| 2020/0371409 A1* | 11/2020 | Huang | G03B 13/34 |
| 2021/0318509 A1* | 10/2021 | Jun | G03B 17/17 |
| 2022/0066125 A1* | 3/2022 | Jun | G02B 7/08 |

FOREIGN PATENT DOCUMENTS

| | | |
|---|---|---|
| KR | 10-1317085 B1 | 10/2013 |
| KR | 10-2019-0096133 A | 8/2019 |
| KR | 10-2019-0116808 A | 10/2019 |
| KR | 10-2020-0051354 A | 5/2020 |

* cited by examiner

LENS MODULE AND CAMERA MODULE INCLUDING THE SAME

CROSS-REFERENCE TO RELATED APPLICATION(S)

This application claims benefit under 35 USC § 119(a) of Korean Patent Application No. 10-2020-0112427 filed on Sep. 3, 2020, in the Korean Intellectual Property Office, the entire disclosure of which is incorporated herein by reference for all purposes.

BACKGROUND

1. Field

The following description relates to a lens module and a camera module including the same.

2. Description of Related Art

Recently, camera modules have been used in portable electronic devices such as tablet personal computers (PCs), laptop computers, and similar devices, as well as smartphones. Additionally, functions, such as an autofocusing (AF) function, an optical image stabilization (OIS) function, a zoom function, and similar functions, have been added to camera modules implemented in mobile terminals.

However, in order to implement these various functions, the structure of camera modules have become complicated, and the size of the camera module has increased, thereby resulting in an increase in the size of the portable electronic device in which the camera module is mounted.

In view of the growth of the smartphone camera market, attempts to miniaturize and integrate functions of typical manual cameras, such as an AF function and an optical zoom function with an OIS driving manner have been continuously undertaken. Accordingly, a structure of the camera module may be diversified. Therefore, OIS driving schemes other than existing OIS driving schemes are necessary.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a lens module includes a carrier, configured to have an internal space; a lens unit, comprising a plurality of lens groups, and installed in the carrier so that at least one of the plurality of lens groups is configured to move in a length direction of the carrier; a lens guide unit, comprising a plurality of guide members arranged on a first surface and a second surface of the plurality of lens groups, and configured to guide a movement of at least two lens groups of the plurality of lens groups; and a plurality of driving wires, connected to each of the plurality of guide members, wherein the carrier comprises an auxiliary guide member configured to have an auxiliary guide hole, and disposed on at least one side surface of the plurality of lens groups, the auxiliary guide hole being disposed parallel to a movement direction of the at least two lens groups of the plurality of lens groups to guide the movement of the at least two lens groups of the plurality of lens group.

The plurality of guide wires may be formed of a shape memory alloy.

The at least two moving lens group may each have a coupling protrusion that penetrates through the auxiliary guide hole, and the coupling protrusion is moved along the auxiliary guide hole.

The guide member may include a first guide member disposed on a first side surface of the plurality of lens groups, a second guide member disposed to be overlapped with the first guide member, a third guide member disposed on a second side surface of the plurality of lens groups, and a fourth guide member disposed to be overlapped with the third guide member.

The first guide member may have a plurality of first inclined guide holes arranged to be inclined in a first direction, and the second guide member has a plurality of second inclined guide holes arranged to intersect the first inclined guide holes, and the third guide member may have a plurality of third inclined guide holes arranged to be inclined in a first direction, and the fourth guide member has a plurality of fourth inclined guide holes arranged to intersect the third inclined guide holes.

The coupling protrusions may penetrate through the auxiliary guide holes to be coupled to the first inclined guide holes and the second inclined guide holes, and the third inclined guide holes and the fourth inclined guide holes.

The driving wire may include first and second driving wires, disposed to cross each other at an upper end of the first guide member, and each having a first end connected to the upper end of the first guide member, and third and fourth driving wires, disposed to cross each other below the first and second driving wires, and each having one end connected to a lower end of the first guide member; fifth and sixth driving wires, disposed to cross each other at an upper end of the second guide member, and each having a first end connected to the upper end of the second guide member, and seventh and eighth driving wires disposed to cross each other below the fifth and sixth driving wires and each having one end connected to a lower end of the second guide member; ninth and tenth driving wires, disposed to cross each other at an upper end of the third guide member and each having a first end connected to the upper end of the third guide member, and eleventh and twelfth driving wires disposed to cross each other below the ninth and tenth driving wires and each having one end connected to a lower end of the third guide member; and thirteenth and fourteenth driving wires, disposed to cross each other at an upper end of the fourth guide member and each having a first end connected to the upper end of the fourth guide member, and fifteenth and sixteenth driving wires disposed to cross each other below the thirteenth and fourteenth driving wires and each having one end connected to a lower end of the fourth guide member.

Each of the first to fourth guide members may be configured to guide the movement of the at least two lens groups while ascending and descending in a vertical direction of the carrier.

The carrier may include a bottom plate and a cover plate disposed to face the bottom plate, and each of the bottom plate and the cover plate may include a mounting portion installed with an installation bar to which a second end of the driving wire is connected.

A first end of the driving wire may be connected to a connection hole provided in each of the first to fourth guide members, and a second end of the driving wire is connected to the installation bar.

The lens unit may include a first lens group, fixed and installed on a first side of the carrier; a second lens group, disposed behind the first lens group, and configured to move in an incident direction of light; and a third lens group, disposed behind the second lens group, and configured to move.

Each of the second lens group and the third lens group may have a coupling protrusion penetrating through the auxiliary guide hole to be coupled to the guide member.

The auxiliary guide member may be detachably installed to the carrier.

The lens module may include cover members coupled to the carrier, and disposed on the first surface and the second surface of the plurality of lens groups.

The cover member may have protrusions for reducing a contact area with the guide member when the guide member ascends and descends.

In a general aspect, a camera module includes a reflecting module configured to change a path of light incident in the reflecting module; and a lens module including a carrier, configured to have an internal space; a lens unit, comprising a plurality of lens groups, and installed in the carrier so that at least one of the plurality of lens groups is configured to move in a length direction of the carrier; a lens guide unit, comprising a plurality of guide members arranged on a first surface and a second surface of the plurality of lens groups, and configured to guide a movement of at least two lens groups of the plurality of lens groups; and a plurality of driving wires, connected to each of the plurality of guide members, wherein the carrier comprises an auxiliary guide member configured to have an auxiliary guide hole, and disposed on at least one side surface of the plurality of lens groups, the auxiliary guide hole being disposed parallel to a movement direction of the at least two lens groups of the plurality of lens groups to guide the movement of the at least two lens groups of the plurality of lens group.

In a general aspect, an electronic device includes one or more camera modules, including a reflecting module, configured to change a direction of light; a lens module, including a carrier, a first lens group fixed to the carrier, a second lens group, disposed on a first side of the first lens group, and configured to move in a first direction; and a third lens group, disposed adjacent to the second lens group, and configured to move in the first direction, wherein the carrier comprises a guide member including a guide hole disposed parallel to the first direction, and configured to guide the movement of the second lens group and the third lens group.

The second lens group and the third lens group may include a coupling protrusion configured to penetrate the guide hole.

The electronic device may include one or more driving wires, configured to generate a driving force to move the second lens group and the third lens group.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Figure 1:
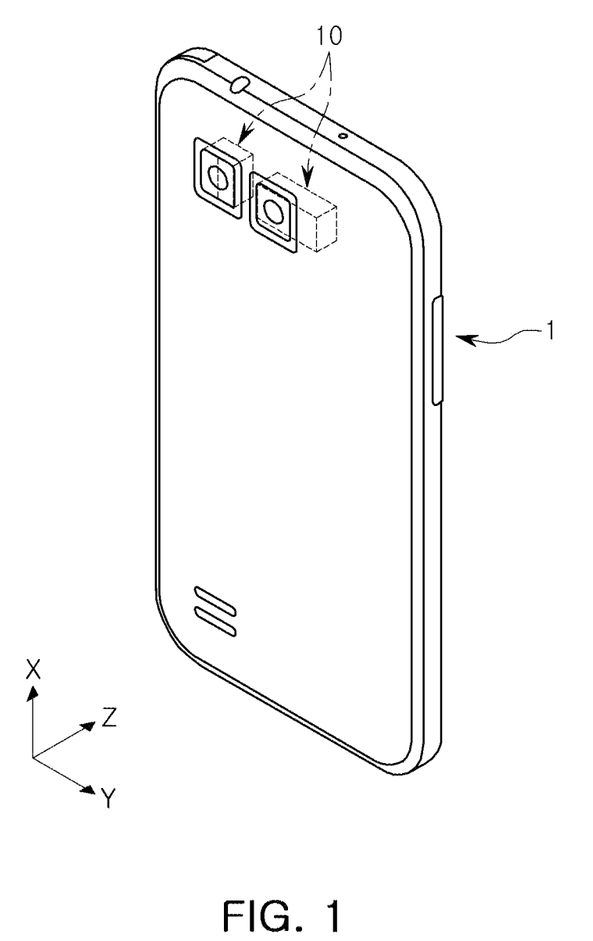
FIG. 1 illustrates a perspective view of an example portable electronic device, in accordance with one or more embodiments.

FIG. 1 illustrates a perspective view of an example portable electronic device, in accordance with one or more embodiments.

Referring to FIG. 1, a portable electronic device 1, in accordance with one or more embodiments, may be a portable electronic device such as, but not limited to, a mobile communications terminal, a smartphone, a tablet personal computer (PC), or similar device, in which a camera module 10 is mounted.

As illustrated in FIG. 1, the example portable electronic device 1 may be mounted with, as a non-limited example, two camera modules 10 which capture an image of a subject.

In an example, one of the at least two camera modules 10 may include a plurality of lenses, and an optical axis (a Y-axis) of each of the lenses may be directed toward a direction perpendicular to a thickness direction (a Z-axis direction or a direction from a front surface of the portable electronic device to a rear surface thereof, or an opposite direction to the direction from the front surface of the portable electronic device to the rear surface thereof) of the portable electronic device 1.

As an example, an optical axis (a Y-axis) of each of a plurality of lenses included in the other camera module 10 may be formed in the thickness direction (the Z-axis direction) of the portable electronic device 1.

Therefore, although the camera module 10 includes functions such as, but not limited to, an autofocusing (hereinafter, referred to as AF) function, a zoom function, and an optical image stabilization (hereinafter, referred to as OIS) function, a thickness of the portable electronic device 1 may not be increased. Therefore, the portable electronic device 1 may be implemented in a miniaturized form factor.

The camera module 10, in accordance with one or more embodiments, may have at least one of, but not limited to, the AF function, the zoom function, and the OIS function.

Since the camera module 10 having the AF function, the zoom function, the OIS function, and similar functions, should include various components, a size of the camera module may be increased as compared to a general camera module.

When the size of the camera module 10 is increased, a problem may occur in that it may not be possible to miniaturize the portable electronic device 1 in which the camera module 10 is mounted.

In an example, when the number of stacked lenses in the camera module is increased for the purpose of implementing the zoom function, and a plurality of stacked lenses are formed in the camera module in the thickness direction of the portable electronic device 1, the thickness of the portable electronic device 1 may also be increased depending on the number of stacked lenses. Therefore, when the thickness of the portable electronic device 1 is not increased, the number of stacked lenses may not be sufficiently secured, such that zoom performance may be deteriorated.

Additionally, an actuator that moves a lens group in an optical axis direction or a direction perpendicular to the optical axis should be installed in order to implement the AF function and the OIS function, and when the optical axis (the Y-axis) of the lens group is formed in the thickness direction of the portable electronic device, the actuator moving the lens group should also be installed in the thickness direction of the portable electronic device. Therefore, the thickness of the portable electronic device may be increased.

However, in the camera module 10 according to an example, the plurality of lenses may be arranged so that the optical axis (the Y-axis) of each of the plurality of lenses is perpendicular to the thickness direction of the portable electronic device 1. Therefore, although the camera module 10 having functions such as the AF function, the zoom function, and the OIS function, may be mounted in the portable electronic device 1, the portable electronic device 1 may have a miniaturized form function.

Figure 2:
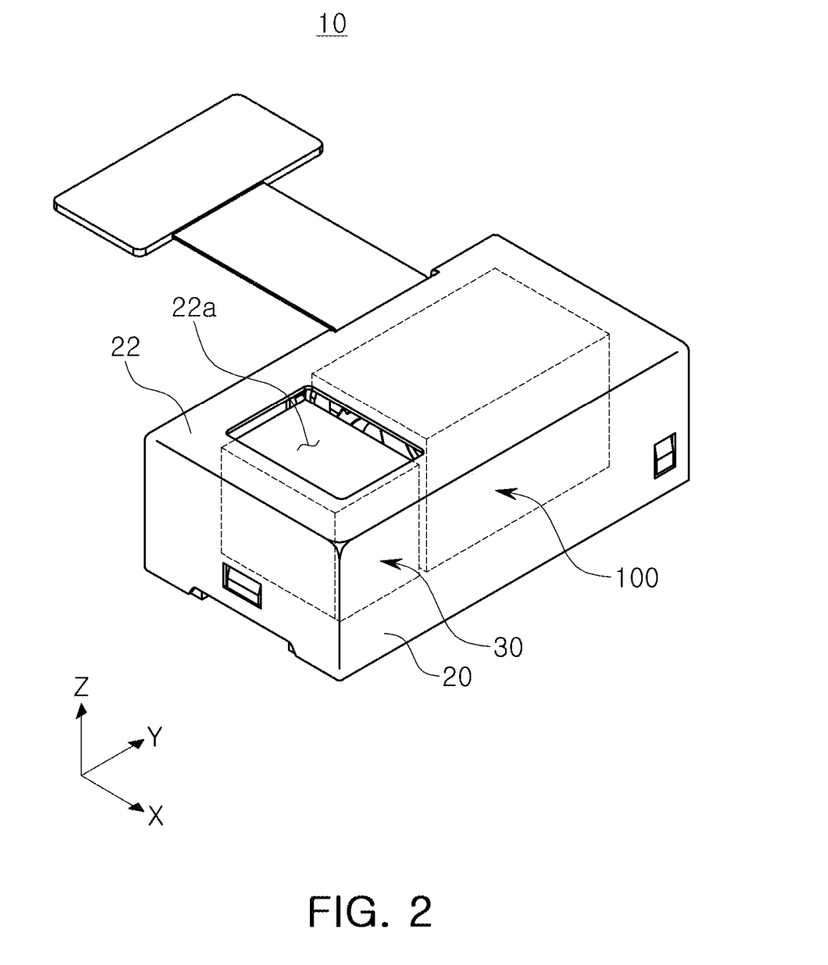
FIG. 2 illustrates a schematic perspective view illustrating a camera module according to a first exemplary embodiment in the present disclosure.

FIG. 2 illustrates a schematic perspective view of an example camera module, in accordance with one or more embodiments.

Referring to FIG. 2, the camera module 10, in accordance with one or more embodiments, may include a reflecting module 30, a lens module 100, and an image sensor module (not illustrated) provided in a housing 20.

The reflecting module 30 may change a moving direction of light. As an example, a moving direction of light incident through an opening 22a of a cover 22 covering the camera module 10 above the camera module 10 may be changed through the reflecting module 30 so that the light is directed toward the lens module 100. To this end, the reflecting module 30 may include a reflecting member (not illustrated) reflecting the light.

A path of the light incident through the opening 22a may be changed by the reflecting module 30 so that the light is directed toward the lens module 100. In an example, a path of light incident to the camera module 10 in a thickness direction (a Z-axis direction) of the camera module 10 may be changed by the reflecting module 30 to approximately coincide with an optical axis direction (a Y-axis direction).

The lens module 100 may include a plurality of lenses through which the light whose moving direction is changed by the reflecting module 30 passes, and the image sensor module may include an image sensor (not illustrated) that converts the light passing through the plurality of lenses into an electrical signal and a printed circuit board (not illustrated) on which the image sensor is mounted. Additionally, the image sensor module may include an optical filter (not illustrated) that filters the light incident from the lens module 100 thereto. The optical filter (not illustrated) may be, as a non-limiting example, an infrared cut-off filter.

In an internal space of the housing 20, the reflecting module 30 may be provided in front of the lens module 100, and the image sensor module may be provided behind the lens module 100.

Figure 3:
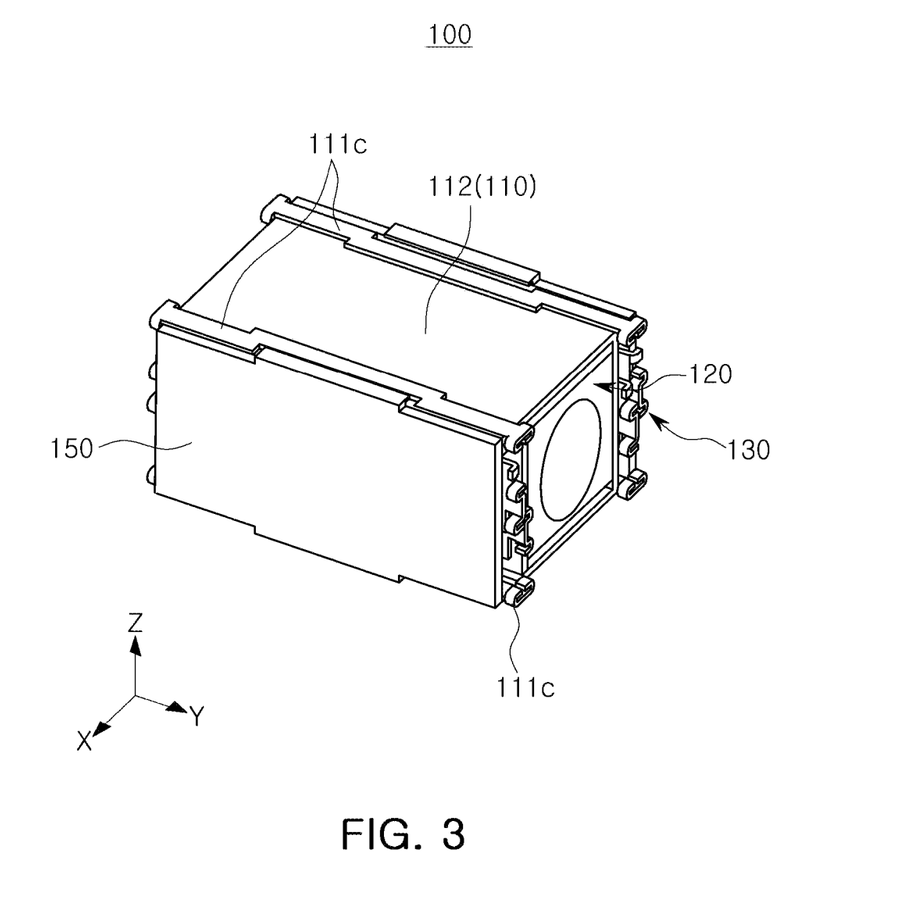
FIG. 3 illustrates a perspective view of an example lens module, in accordance with one or more embodiments.
Figure 4:
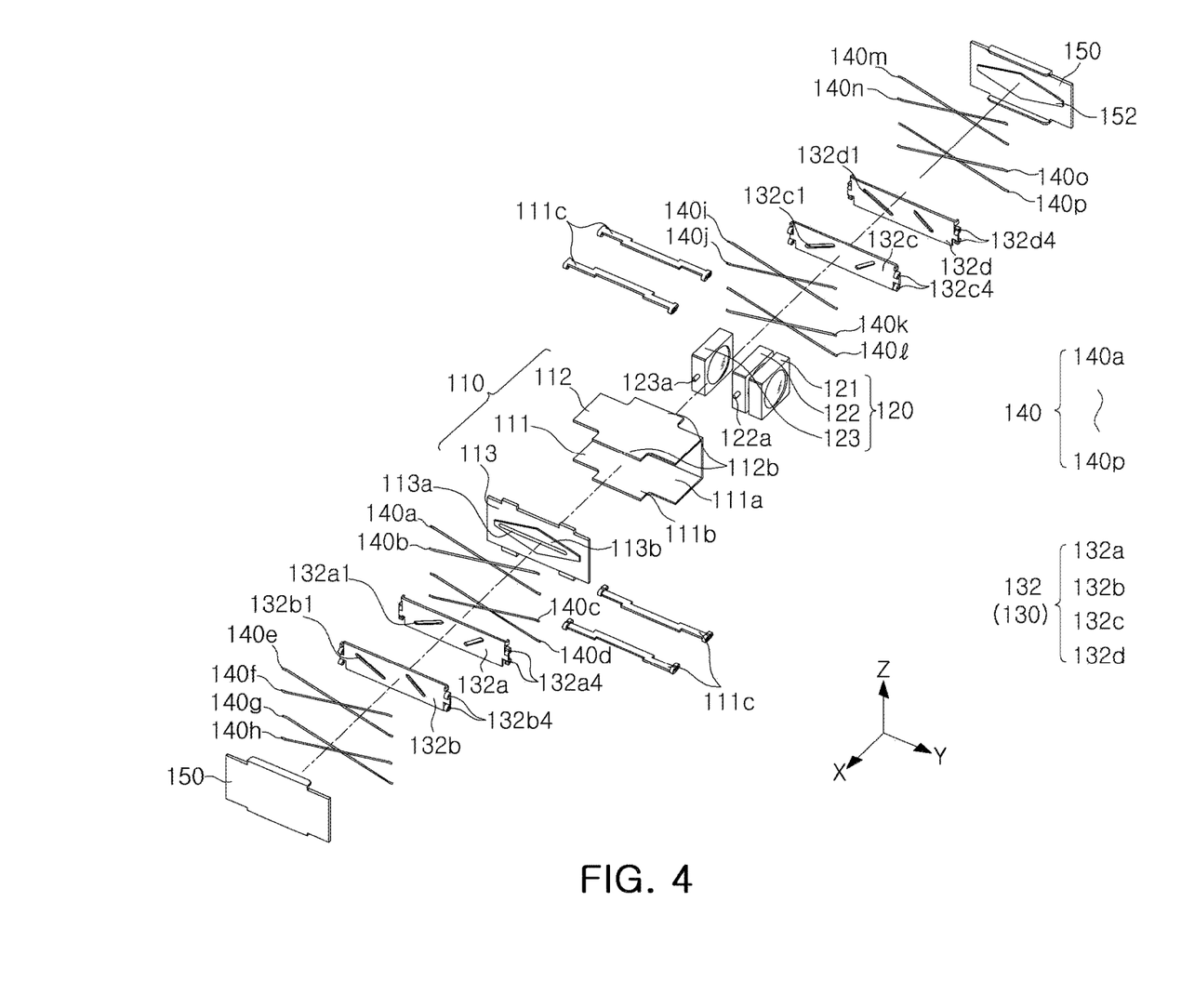
FIG. 4 illustrates an exploded perspective view of an example lens module, in accordance with one or more embodiments.

FIG. 3 is a perspective view of an example lens module, in accordance with one or more embodiments, and FIG. 4 is an exploded perspective view illustrating the example lens module, in accordance with one or more embodiments.

Referring to FIGS. 3 and 4, as an example, the lens module 100, in accordance with one or more embodiments, may include a carrier 110, a lens unit 120, a lens guide unit 130, a driving wire 140 (FIG. 4), and a cover member 150.

The carrier 110 may have an internal space, and the lens unit 120 may be disposed in the internal space of the carrier 110. As an example, the carrier 110 may have a substantially rectangular parallelepiped box shape in which both ends are opened. The carrier 110 may include a bottom plate 111, a cover plate 112 disposed to face the bottom plate 111, and an auxiliary guide member 113 disposed in a length direction of the carrier 110, for example, the Y-axis direction, and having an auxiliary guide hole 113a. As an example, the auxiliary guide member 113 may be detachably installed on at least one side of each of the bottom plate 111 and the cover plate 112. Additionally, the auxiliary guide hole 113a may be disposed at a central portion of the auxiliary guide member 113 in a length direction. Additionally, the auxiliary guide member 113 may include a step portion 113b that protrudes to reduce friction with a guide member 132 of the lens guide unit 130 to be described below.

Additionally, both ends of the carrier 110 may be opened.

The bottom plate 111 may include a support portion 111a on which the lens unit 120 is disposed, and a mounting portion 111b extending from both sides of the support portion 111a and installed with an installation bar 111c to which the driving wire 140 is connected.

Meanwhile, the cover plate 112 may also include a mounting portion 112b installed with the installation bar 111c to which the driving wire 140 is connected.

FIG. 4 illustrates an example where one auxiliary guide member 113 is installed at the bottom plate 111 and the cover plate 112 and an example where the other auxiliary guide member 113 is separated from the bottom plate 111 and the cover plate 112, but all of the two auxiliary guide members 113 disposed to face each other may be detachably installed to the bottom plate 111 and the cover plate 112.

Here, terms with respect to directions will be defined. A thickness direction of the carrier 110 refers to the Z-axis direction illustrated in FIGS. 3 and 4, a length direction of the carrier 110 refers to the Y-axis direction illustrated in FIGS. 3 and 4, and a width direction of the carrier 110 refers to the X-axis direction illustrated in FIGS. 3 and 4.

The lens unit 120 may include a plurality of lens groups and may be installed in the carrier 110 to be disposed in the internal space of the carrier 110. In an example, the lens unit 120 may include a first lens group 121 fixed and installed on one side of the carrier 110, a second lens group 122 disposed on one side of the first lens group 121 and movably installed in the carrier 110, and a third lens group 123 disposed on one side of the second lens group 122 and movably installed in the carrier 110.

In an example, the second and third lens groups 122 and 123 may be connected to the lens guide unit 130 to be moved in the Y-axis direction. To this end, the second and third lens groups 122 and 123 may have coupling protrusions 122a and 123a, respectively, to be connected to the lens guide unit 130. In an example, the coupling protrusions 122a and 123a may be disposed to penetrate through the auxiliary guide hole 113a. As described above, the coupling protrusions 122a and 123a may be disposed to be moved along the auxiliary guide hole 113a, such that it is possible to prevent the second and third lens groups 122 and 123 from being moved in the Z-axis direction. Accordingly, the second and third lens groups 122 and 123 may be more stably moved in the Y-axis direction.

Additionally, at least one of the first, second, and third lens groups 121, 122, and 123 constituting the lens unit 120 may include a plurality of lenses.

The lens guide unit 130 may include a plurality of guide members 132 arranged on each of both side surfaces of the lens groups 121, 122, and 123 to guide movement of at least two lens groups 122 and 123 of the plurality of lens groups 121, 122, and 123. That is, the lens guide unit 130 may be connected to the lens unit 120 to serve to guide movement of some lens groups constituting the lens unit 120, that is, movement of the second and third lens groups 122 and 123. The guide member 132 of the lens guide unit 130 may include a first guide member 132a disposed on one side surface of each of the second and third lens groups 122 and 123, a second guide member 132b disposed to be overlapped with the first guide member 132a, a third guide member 132c disposed on the other side surface of each of the second and third lens groups 122 and 123, and a fourth guide member 132d disposed to be overlapped with the third guide member 132c.

In an example, the first guide member 132a may have a plurality of first inclined guide holes 132a1 arranged to be inclined in one direction, and the second guide member 132b may have a plurality of second inclined guide holes 132b1 arranged to intersect the first inclined guide holes 132a1. Additionally, the third guide member 132c may have a plurality of third inclined guide holes 132c1 arranged to be inclined in one direction, and the fourth guide member 132d may have a plurality of fourth inclined guide holes 132d1 arranged to intersect the third inclined guide holes 132c1.

As an example, the coupling protrusions 122a and 123a of the respective second and third lens groups 122 and 123 may penetrate through the auxiliary guide holes 113a to be disposed in the first to fourth inclined guide holes 132a1, 132b1, 132c1, and 132d1. Accordingly, the coupling protrusions 122a and 123a may be moved along the first to fourth inclined guide holes 132a1, 132b1, 132c1, and 132d1 while being moved along the auxiliary guide holes 113a according to ascending and descending of the first to fourth guide members 132a, 132b, 132c, and 132d. Therefore, the second and third lens groups 122 and 123 may be more stably moved. In other words, the second and third lens groups 122 and 123 may be moved in the length direction of the carrier 110, that is, in only the Y-axis direction.

Further, both ends of the first to fourth guide members 132a, 132b, 132c, and 132d may include connection holes 132a4, 132b4, 132c4, and 132d4 provided to prevent separation from the carrier 110 and connected to the driving wires 140. As an example, two connection holes 132a4, 132b4, 132c4, and 132d4 may be provided to be vertically arranged at one end of each of the first to fourth guide members 132a, 132b, 132c, and 132d. The connection holes 132a4 and 132c4 of the first and third guide members 132a and 132c may be supported by both ends of the carrier 110, and the connection holes 132b4 and 132d4 of the second and fourth guide members 132b and 132d may be supported by both ends of the cover member 150.

The driving wire 140 may generate a driving force to move the lens unit 120. In an example, four or more driving wires 140 may be connected to each of the guide members 132 and the driving wire 140 may be formed of a shape memory alloy.

The driving wire 140 may include first and second driving wires 140a and 140b, disposed to cross each other at an upper end of the first guide member 132a, and each having one end connected to the upper end of the first guide member 132a, and third and fourth driving wires 140c and 140d disposed to cross each other below the first and second driving wires 140a and 140b, and each having one end connected to a lower end of the first guide member 132a.

Additionally, the driving wire 140 may include fifth and sixth driving wires 140e and 140f disposed to cross each other at an upper end of the second guide member 132b, and each having one end connected to the upper end of the second guide member 132b, and seventh and eighth driving wires 140g and 140h disposed to cross each other below the fifth and sixth driving wires 140e and 140f and each having one end connected to a lower end of the second guide member 132b.

Additionally, the driving wire 140 may include ninth and tenth driving wires 140i and 140j disposed to cross each other at an upper end of the third guide member 132c, and each having one end connected to the upper end of the third guide member 132c, and eleventh and twelfth driving wires 140k and 140l disposed to cross each other below the ninth and tenth driving wires 140i and 140j and each having one end connected to a lower end of the third guide member 132c.

Further, the driving wire 140 may include thirteenth and fourteenth driving wires 140m and 140n disposed to cross each other at an upper end of the fourth guide member 132d and each having one end connected to the upper end of the fourth guide member 132d, and fifteenth and sixteenth driving wires 140o and 140p disposed to cross each other below the thirteenth and fourteenth driving wires 140m and 140n and each having one end connected to a lower end of the fourth guide member 132d.

In an example, first ends of the respective first to sixteenth driving wires 140a to 140p may be connected to the connection holes 132a4, 132b4, 132c4, and 132d4 of the guide members 132 and second ends of the respective first to sixteenth driving wires 140a to 140p may be connected to the installation bars 111c of the carrier 110.

As described above, the first to fourth guide members 132a to 132d may ascend and descend according to expansion and contraction of the driving wires 140 formed of the shape memory alloy, and the second and third lens groups 122 and 123 of the lens unit 120 may be moved in the carrier 110 in the Y-axis direction.

The cover member 150 may be coupled to a front surface and a rear surface of the carrier 110 and may have a plate shape. As an example, both ends of the cover member 150 may be in contact with the connection holes 132b4 and 132d4 of the second and fourth guide members 132b and 132d and may serve to guide the ascending and descending of the second and fourth guide members 132b and 132d. Additionally, the cover member 150 may have protrusions 152 for reducing a contact area with each of the second and fourth guide members 132b and 132d when the second and fourth guide members 132b and 132d ascend and descend.

As described above, a movement distance of each of the second and third lens groups 122 and 123 may be increased, such that deterioration in image quality in a high-magnification zoom function may be prevented.

Additionally, the second and third lens groups 122 and 123 may be moved through the driving wires 140, such that the lens module 100 may have a miniaturized and thin form factor.

Further, the movement of the second and third lens groups 122 and 123 may be guided through the auxiliary guide members 113 of the carrier 110 and the lens guide unit 130, such that the second and third lens groups 122 and 123 may be stably moved.

Further, the lens guide unit 130 may be vertically moved through the driving wires 140 to move the second and third lens groups 122 and 123 in an incident direction of light. Accordingly, the movement distance of each of the second and third lens groups 122 and 123 may be sufficiently secured through the driving wires 140 formed of the shape memory alloy with a limited displacement, such that the deterioration in image quality in the high-magnification zoom function may be prevented.

Hereinafter, an operation of the lens module, in accordance with one or more embodiments, will be described with reference to the drawings.

FIGS. 5 through 10 are views describing the operation of an example lens module, in accordance with one or more embodiments.

Figure 5:
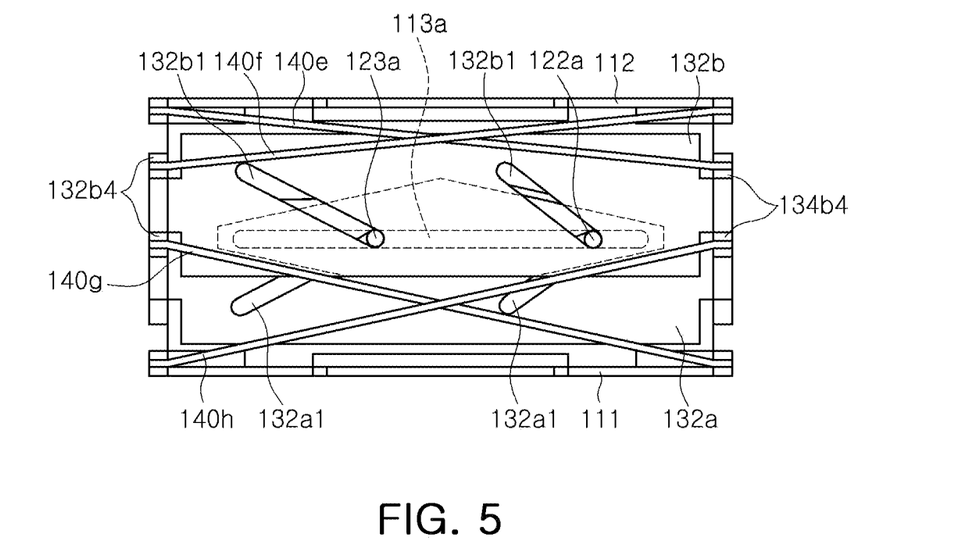
FIGS. 5 through 10 are views illustrating an operation of an example lens module, in accordance with one or more embodiments.
Figure 6:
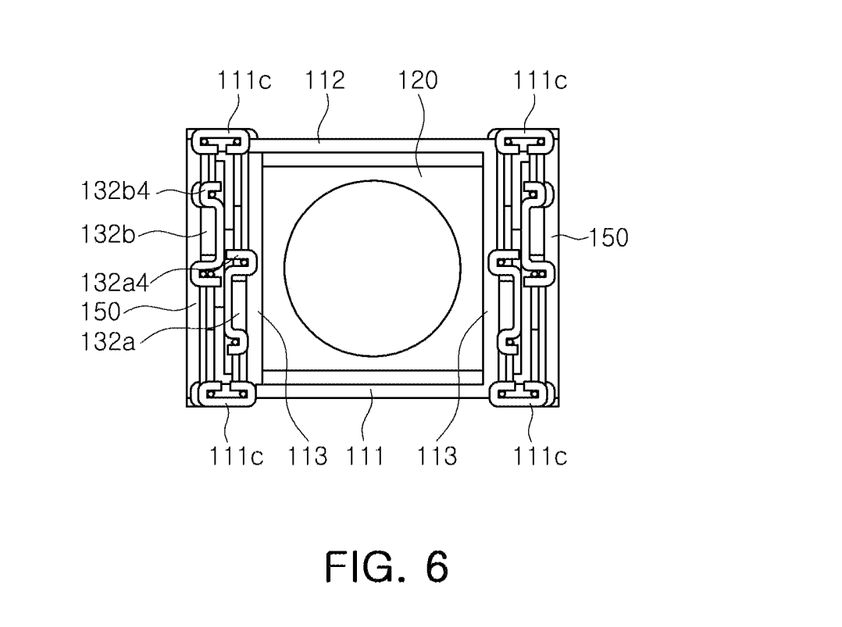

As illustrated in FIGS. 5 and 6, when power is not supplied to the driving wires 140, a lower surface of the first guide member 132a may be disposed adjacent to the bottom plate 111 of the carrier 110, and an upper surface of the second guide member 132b may be disposed to be in contact with the cover plate 112 of the carrier 110. Additionally, in this example, the second lens group 122 may be disposed adjacent to the first lens group 121 (see FIG. 4). Further, the coupling protrusions 122a and 123a of the second and third lens groups 122 and 123 may penetrate through the auxiliary guide holes 113a of the auxiliary guide members 113 and may be arranged at first ends of the respective first and second inclined guide holes 132a1 and 132b1 of the first and second guide members 132a and 132b.

Figure 7:
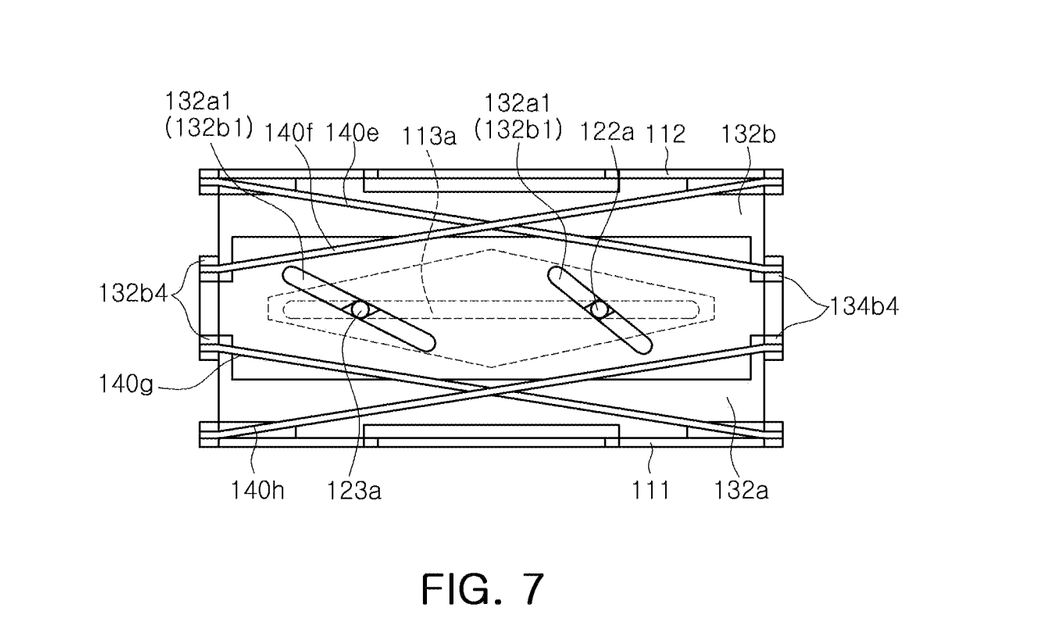
Figure 8:
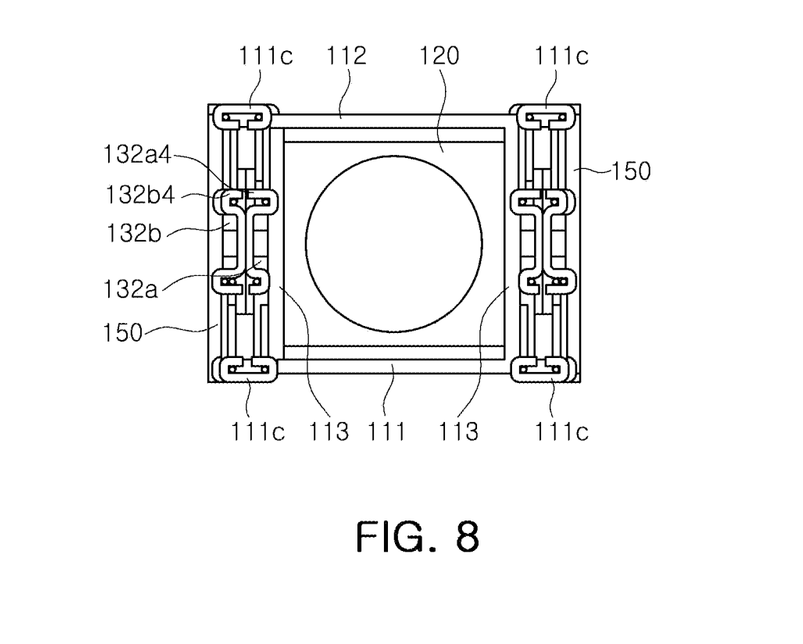

Thereafter, when power is supplied to the driving wires 140, the first and second driving wires 140a and 140b (see FIG. 4) may be contracted, and the third and fourth driving wires 140c and 140d (see FIG. 4) may be expanded. Accordingly, the first guide member 132a may be moved upwardly. Additionally, the fifth and sixth driving wires 140e and 140f may be expanded, and the seventh and eighth driving wires 140g and 140h may be contracted. Accordingly, the second guide member 132b may be moved downwardly. Thereafter, as illustrated in FIGS. 7 and 8, the first and second guide members 132a and 132b may be disposed to be overlapped with each other at the same height. In this example, the coupling protrusions 122a and 123a of the second and third lens groups 122 and 123 may be disposed at central portions of the first and second inclined guide holes 132a1 and 132b1 of the first and second guide members 132a and 132b. Additionally, the coupling protrusions 122a and 123a of the second and third lens groups 122 and 123 may be moved along the auxiliary guide hole 113a of the auxiliary guide member 113.

Figure 9:
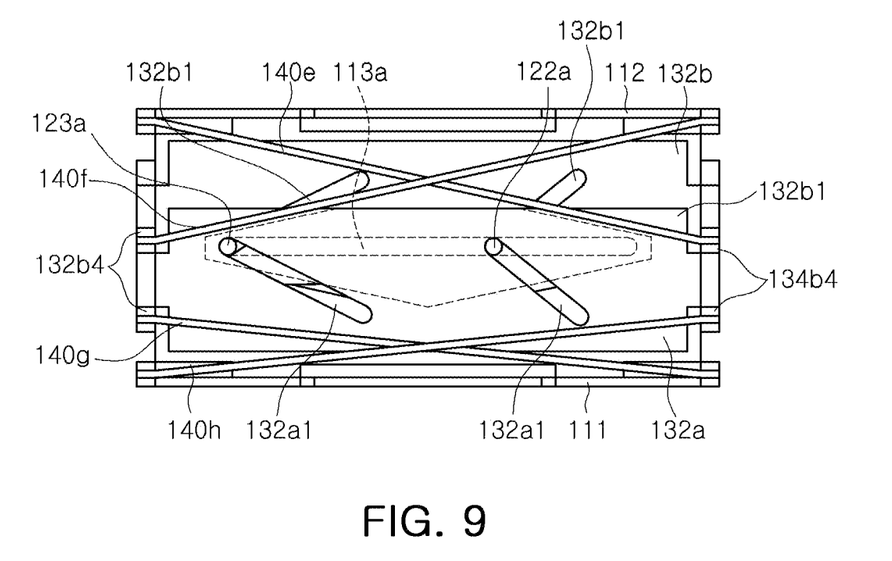
Figure 10:
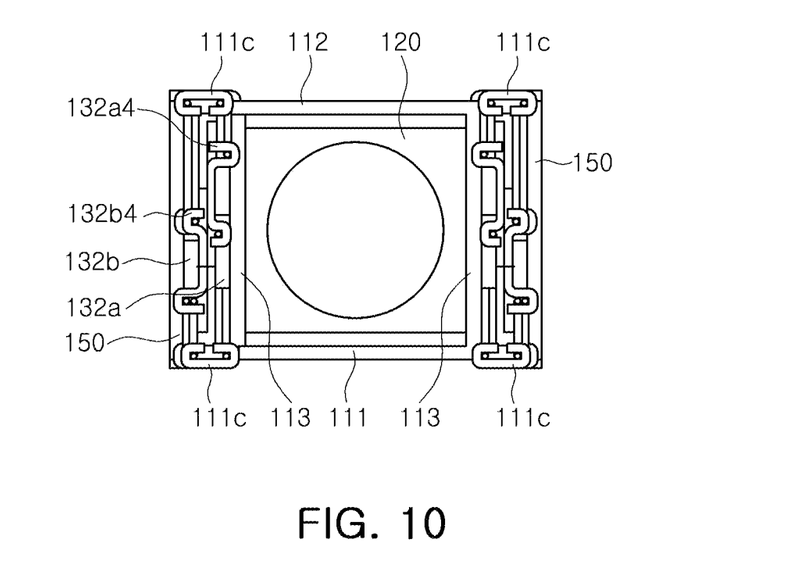

Thereafter, when power is continuously supplied to the driving wires 140, the first and second driving wires 140a and 140b may be continuously contracted, and the third and fourth driving wires 140c and 140d may be continuously expanded. Additionally, the fifth and sixth driving wires 140e and 140f may be continuously expanded and the seventh and eighth driving wires 140g and 140h may be continuously contracted. Accordingly, as illustrated in FIGS. 9 and 10, a lower surface of the second guide member 132b may be disposed adjacent to the bottom plate 111 of the carrier 110, and an upper surface of the first guide member 132a may be disposed to be in contact with the cover plate 112 of the carrier 110. In this example, the coupling protrusions 122a and 123a of the second and third lens groups 122 and 123 may be disposed at second ends of the first and second inclined guide holes 132a1 and 132b1 of the first and second guide members 132a and 132b. Additionally, the coupling protrusions 122a and 123a of the second and third lens groups 122 and 123 may be moved along the auxiliary guide hole 113a of the auxiliary guide member 113.

As described above, the coupling protrusions 122a and 123a of the second and third lens groups 122 and 123 may penetrate through the auxiliary guide hole 113a of the auxiliary guide member 113 and may be moved along the auxiliary guide hole 113a, such that it is possible to prevent the second and third lens groups 122 and 123 from being moved in the Y-axis direction.

In an example, although the operation of each of the first and second guide members 132*a* and 132*b* has been described above, the third and fourth guide members 132*c* and 132*d* may be operated in the same manner as those of the first and second guide members 132*a* and 132*b*. That is, the first guide member 132*a* and the third guide member 132*c* may be operated in the same manner, and the second guide member 132*b* and the fourth guide member 132*d* may be operated in the same manner. Further, the ninth to sixteenth driving wires 140*i* to 140*p* connected to the third and fourth guide members 132*c* and 132*d* may also be operated in the same manner as those of the first to eighth driving wires 140*a* to 140*h*.

As described above, the second and third lens groups 122 and 123 may be moved in the length direction (that is, the Y-axis direction) of the carrier 110, such that the movement distance of each of the second and third lens groups 122 and 123 may be increased. As a result, the deterioration in image quality in the high-magnification zoom function may be prevented.

Additionally, the second and third lens groups 122 and 123 may be moved through the driving wires 140, such that the lens module 100 may be implemented in miniaturized and thin form factor.

Further, the movement of the second and third lens groups 122 and 123 may be guided through the auxiliary guide member 113 and the lens guide unit 130, such that the second and third lens groups 122 and 123 may be stably moved.

Further, the lens guide unit 130 may be vertically moved through the driving wire 140 to move the second and third lens groups 122 and 123 in the incident direction of light. Accordingly, the movement distance of each of the second and third lens groups 122 and 123 may be sufficiently secured through the driving wires 140 formed of the shape memory alloy with a limited displacement, such that the deterioration in image quality in the high-magnification zoom function may be prevented.

As set forth above, according to the examples, the lens may be more smoothly moved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module, comprising:
a carrier, configured to have an internal space;
a lens unit, comprising a plurality of lens groups, and installed in the carrier so that at least one of the plurality of lens groups is configured to move in a length direction of the carrier;
a lens guide unit, comprising a plurality of guide members arranged on a first surface and a second surface of the plurality of lens groups, and configured to guide a movement of at least two lens groups of the plurality of lens groups; and
a plurality of driving wires, connected to each of the plurality of guide members,
wherein the carrier comprises an auxiliary guide member configured to have an auxiliary guide hole, and disposed on at least one of the first surface and the second surface of the plurality of lens groups, the auxiliary guide hole being disposed parallel to a movement direction of the at least two lens groups of the plurality of lens groups to guide the movement of the at least two lens groups of the plurality of lens group, and
wherein the at least two moving lens group each have a coupling protrusion that penetrates through the auxiliary guide hole.

2. The lens module of claim 1, wherein the plurality of guide wires is formed of a shape memory alloy.

3. The lens module of claim 1, wherein the coupling protrusion is moved along the auxiliary guide hole.

4. The lens module of claim 3, wherein the guide member comprises a first guide member disposed on a first side surface of the plurality of lens groups, a second guide member disposed to be overlapped with the first guide member, a third guide member disposed on a second side surface of the plurality of lens groups, and a fourth guide member disposed to be overlapped with the third guide member.

5. The lens module of claim 4, wherein the first guide member has a plurality of first inclined guide holes arranged to be inclined in a first direction, and the second guide member has a plurality of second inclined guide holes arranged to intersect the first inclined guide holes, and
the third guide member has a plurality of third inclined guide holes arranged to be inclined in a first direction, and the fourth guide member has a plurality of fourth inclined guide holes arranged to intersect the third inclined guide holes.

6. The lens module of claim 5, wherein the coupling protrusions penetrate through the auxiliary guide holes to be coupled to the first inclined guide holes and the second inclined guide holes, and the third inclined guide holes and the fourth inclined guide holes.

7. The lens module of claim 4, wherein the driving wire comprises:
first and second driving wires, disposed to cross each other at an upper end of the first guide member, and each having a first end connected to the upper end of the first guide member, and third and fourth driving wires, disposed to cross each other below the first and second driving wires, and each having one end connected to a lower end of the first guide member;
fifth and sixth driving wires, disposed to cross each other at an upper end of the second guide member, and each having a first end connected to the upper end of the second guide member, and seventh and eighth driving wires disposed to cross each other below the fifth and sixth driving wires and each having one end connected to a lower end of the second guide member;
ninth and tenth driving wires, disposed to cross each other at an upper end of the third guide member and each having a first end connected to the upper end of the third guide member, and eleventh and twelfth driving wires disposed to cross each other below the ninth and tenth driving wires and each having one end connected to a lower end of the third guide member; and thirteenth and fourteenth driving wires, disposed to cross each other at an upper end of the fourth guide member and each having a first end connected to the upper end of the fourth guide member, and fifteenth and sixteenth driving wires disposed to cross each other below the thirteenth and fourteenth driving wires and each having one end connected to a lower end of the fourth guide member.

8. The lens module of claim 7, wherein each of the first to fourth guide members is configured to guide the movement of the at least two lens groups while ascending and descending in a vertical direction of the carrier.

9. The lens module of claim 7, wherein the carrier comprises a bottom plate and a cover plate disposed to face the bottom plate, and each of the bottom plate and the cover plate comprises a mounting portion installed with an installation bar to which a second end of the driving wire is connected.

10. The lens module of claim 9, wherein a first end of the driving wire is connected to a connection hole provided in each of the first to fourth guide members, and a second end of the driving wire is connected to the installation bar.

11. The lens module of claim 1, wherein the lens unit comprises:
   a first lens group, fixed and installed on a first side of the carrier;
   a second lens group, disposed behind the first lens group, and configured to move in an incident direction of light; and
   a third lens group, disposed behind the second lens group, and configured to move.

12. The lens module of claim 11, wherein each of the second lens group and the third lens group has a coupling protrusion penetrating through the auxiliary guide hole to be coupled to the guide member.

13. The lens module of claim 1, wherein the auxiliary guide member is detachably installed to the carrier.

14. The lens module of claim 1, further comprising cover members coupled to the carrier, and disposed on the first surface and the second surface of the plurality of lens groups.

15. The lens module of claim 14, wherein the cover member has protrusions for reducing a contact area with the guide member when the guide member ascends and descends.

16. A camera module, comprising:
   a reflecting module configured to change a path of light incident in the reflecting module; and
   a lens module, comprising:
      a carrier, configured to have an internal space;
      a lens unit, comprising a plurality of lens groups, and installed in the carrier so that at least one of the plurality of lens groups is configured to move in a length direction of the carrier;
      a lens guide unit, comprising a plurality of guide members arranged on a first surface and a second surface of the plurality of lens groups, and configured to guide a movement of at least two lens groups of the plurality of lens groups; and
      a plurality of driving wires, connected to each of the plurality of guide members,
   wherein the carrier comprises an auxiliary guide member configured to have an auxiliary guide hole, and disposed on at least one side surface of the plurality of lens groups, the auxiliary guide hole being disposed parallel to a movement direction of the at least two lens groups of the plurality of lens groups to guide the movement of the at least two lens groups of the plurality of lens group, and
   wherein the at least two lens groups each have a coupling protrusion that penetrates through the auxiliary guide hole.

17. An electronic device, comprising:
   one or more camera modules, comprising:
      a reflecting module, configured to change a direction of light;
      a lens module, comprising:
         a carrier,
         a first lens group fixed to the carrier,
         a second lens group, disposed on a first side of the first lens group, and configured to move in a first direction; and
         a third lens group, disposed adjacent to the second lens group, and configured to move in the first direction,
         wherein the carrier comprises a guide member including a guide hole disposed parallel to the first direction, and configured to guide the movement of the second lens group and the third lens group, and
         wherein the second lens group and the third lens group include a coupling protrusion configured to penetrate the guide hole.

18. The electronic device of claim 17, further comprising one or more driving wires, configured to generate a driving force to move the second lens group and the third lens group.

* * * * *